L. IVERSEN.
UNIVERSAL COUPLING.
APPLICATION FILED MAY 3, 1919.
1,359,601.
Patented Nov. 23, 1920.
2 SHEETS—SHEET 1.
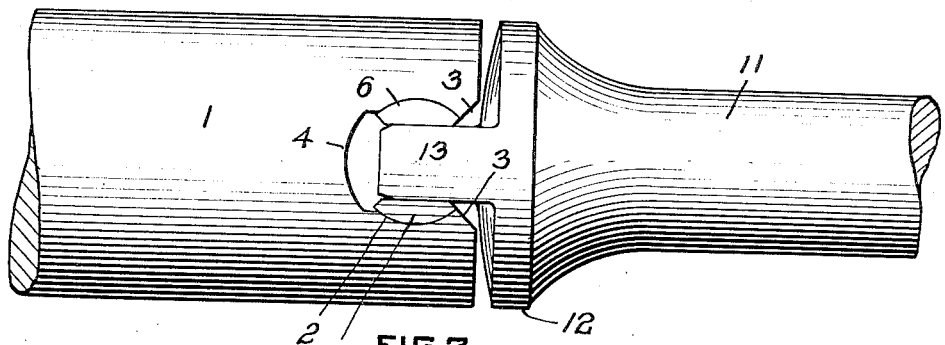
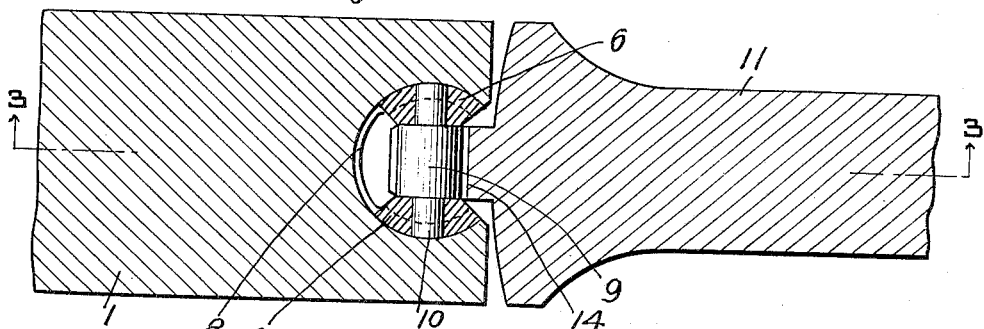
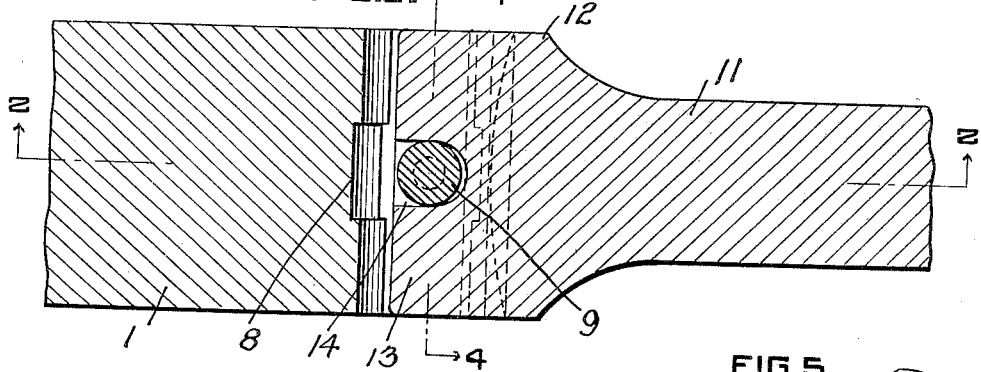
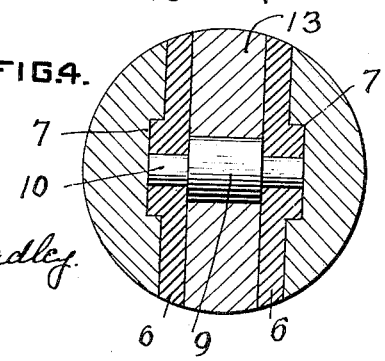
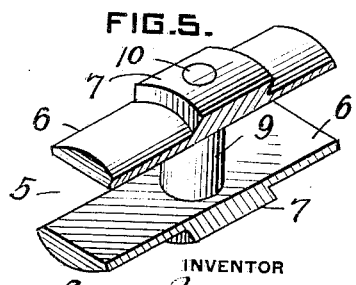
WITNESSES
J. Herbert Bradley
INVENTOR
Lorenz Iversen
By Jno. S. Green
atty.

L. IVERSEN.
UNIVERSAL COUPLING.
APPLICATION FILED MAY 3, 1919.
1,359,601.
Patented Nov. 23, 1920.
2 SHEETS—SHEET 2.
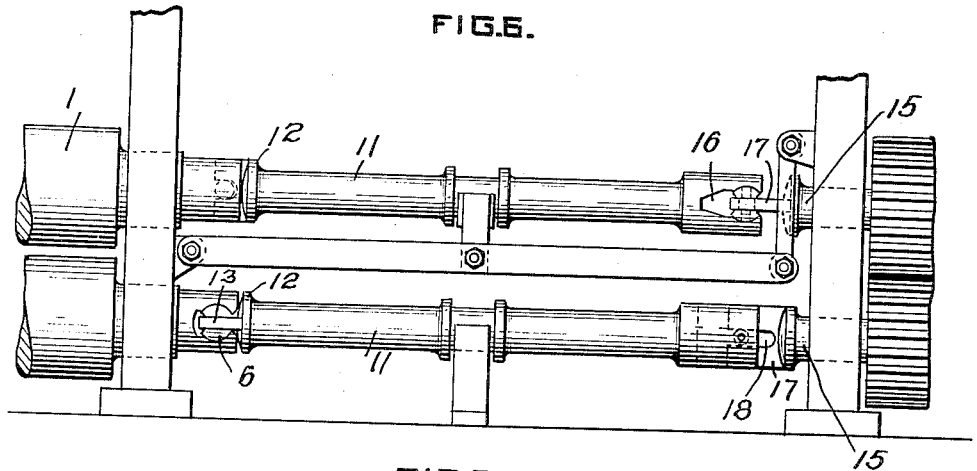
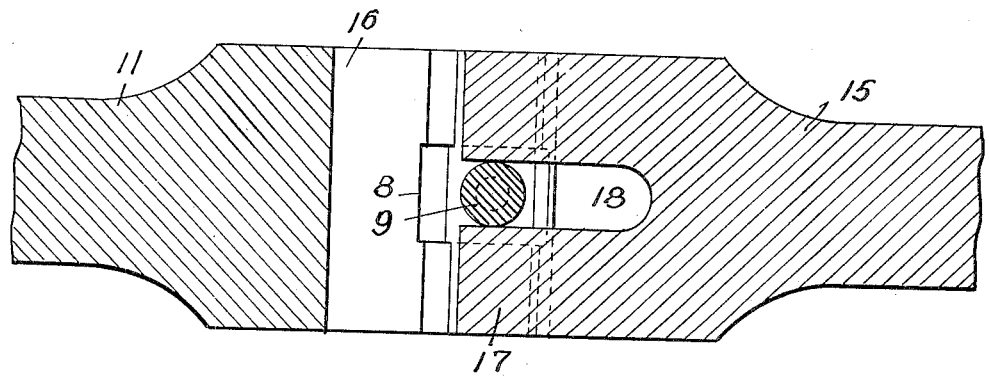
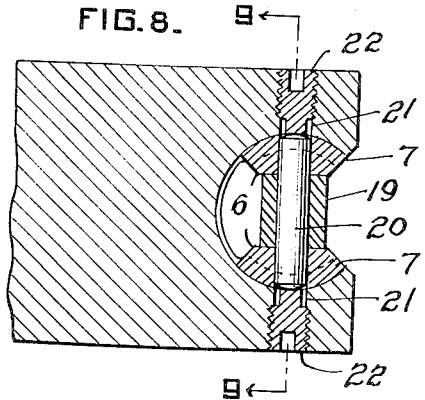
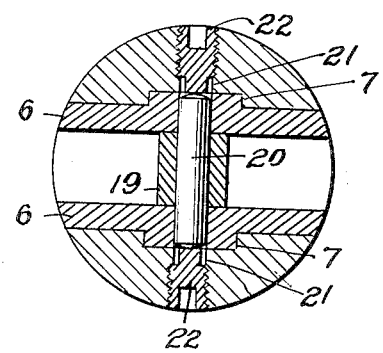
WITNESSES
J. Herbert Bradley.
INVENTOR
Lorenz Iversen
By Jno. S Green
atty.

UNITED STATES PATENT OFFICE.

LORENZ IVERSEN, OF PITTSBURGH, PENNSYLVANIA.

UNIVERSAL COUPLING.

1,359,601.  Specification of Letters Patent.  Patented Nov. 23, 1920.

Application filed May 3, 1919. Serial No. 294,484.

*To all whom it may concern:*

Be it known that I, LORENZ IVERSEN, a citizen of the United States, and a resident of Pittsburgh, in the county of Allegheny, State of Pennsylvania, have made a new and useful Invention in Universal Couplings, of which the following is a specification.

My invention relates to universal couplings and consists of a flexible joining means especially adapted for use with rolls, spindles and pinions in steel mills or where other machinery requiring disalinement of shafts is operated. My object is to provide a coupling that will permit a departure from alinement on the part of the axes of the coupled elements and also permit their rapid assembly or disassembly.

The means by which I obtain these results is illustrated in the drawings forming part of this specification in which Figure 1 is a plan view of the coupled end portions of a spindle and roll made in accordance with my invention; Fig. 2 is a horizontal section through the center of the joint on the line 2—2 of Fig. 3; Fig. 3 is a longitudinal vertical section on line 3—3 of Fig. 2; Fig. 4 is a transverse vertical section on line 4—4 of Fig. 3; Fig. 5 is an isometric view of the pivotal unit which secures universal movement of the coupled parts; Fig. 6 is an assembly view with spindles flexibly secured at the left end to the rolls with the joint arrangement shown in Figs. 1 to 5 and similarly secured at the right end to pinions by the modified joint illustrated in Fig. 7; Fig. 7 is a section similar to Fig. 3 but through the modified coupling shown at the right of Fig. 6; Fig. 8 is a section similar to Fig. 3 but through another modified coupling unit and Fig. 9 is a vertical transverse section on line 9—9 of Fig. 8.

Near the end of roll 1 is a transverse opening formed by a hole 2 with that portion of roll 1 forming the quadrant of the circumference of the hole nearest the end of the roll cut away at 3. The opposite quadrant is slightly enlarged at 4 to a greater radius. This provides a slotted arrangement of the end of roll 1 and the two remaining opposed quadrants of hole 2 form a bearing for a coupling unit 5 best illustrated in Fig. 5.

Unit 5 is formed of two quadrantal segments 6 of a cylinder having the same external diameter as the diameter of hole 2 and provided with a circumferential boss 7 near its center corresponding to a circumferential groove 8 in the roll about the longitudinal center of hole 2. Segments 6 are spaced apart by a shouldered stud 9 which has trunnions 10 fitting in holes in the segments concentric with the axis of stud 9.

Spindle 11 terminates in a spherical end 12 having a transverse tongue extension 13 whose thickness corresponds to the distance between spaced segments 6 of unit 5. Extensions 13 is provided with a transverse slot 14 at its center which is wide enough to accommodate stud 9.

To assemble: Unit 5 is inserted sidewise through the opening between cuts 3—3 in roll 1 until circumferential boss 7 reaches the bottom of groove 8. Unit 5 may then be rotated ninety degrees when it will be in the position shown in Figs. 1, 2 and 3. If spindle 11 be moved longitudinally toward roll 1, tongue 13 will enter between segments 6 and slot 14 will receive stud 9.

It is apparent that the axes of spindle 11 and roll 1 may form various angles with each other about their intersection with the axes of hole 2 and stud 9. For convenience I term these latter axes the vertical and transverse axis respectively, of unit 5. While such angular movement will be limited it will be ample for the purposes of rolling mills or other applications where there is a considerable disalinement.

The opposite end of spindle 11 is provided with a similar universal connection to the end of a pinion 15 shown in Fig. 6. The depression corresponding to enlargement 3 is shown in the form of a slot 16 opposite tongue 17 on pinion 15. A slot 18 in tongue 17 corresponds to slot 14 in tongue 13 but is substantially longer. Slots 16 and 18 permit spindle 11 to be moved to the right from the position shown in Fig. 6 when the left end will be disconnected from roll 1 and the latter may be removed and another roll substituted and by longitudinal movement of the spindle back to the left a universal coupling of the new roll and the spindle will be quickly obtained.

Figs. 8 and 9 illustrate a modification of the coupling unit in which segments 6 are spaced apart by the ends of a roller 19 held in position by a pin 20 fitting in the holes in segments 6 occupied in the preferred form by trunnions 10. Alined with pin 20 are holes 21 in roll 1 through which pin 20 may be inserted or withdrawn. Holes 21 are threaded and plugs 22 are screwed therein to retain pin 20 in position. If plugs 22 are removed and pin 20 withdrawn roller 19 and the spindle coupled thereby to roll 1 may be moved transversely of the roll and uncoupled.

I claim:—

1. A universal coupling comprising a female member provided with a transverse hole which forms an opening in the end of said member of less width than the diameter of said hole, a non-collapsible coupling unit the overall thickness of which in one direction is less than the width of said opening, to permit insertion of said unit through said opening, and the overall width of which in a direction at right angles to said first direction is less than the diameter of said hole to permit rotation of said unit in said hole but greater than the width of said opening to prevent withdrawal of said unit through said opening except when said thickness is presented to the opening, and a male member adapted to be inserted through said opening and to pivotally engage said unit.

2. In a universal coupling, a shaft provided with a flat tongue, a shaft provided with a transverse, cylindrical hole near one end which forms an opening in said end of less width than the diameter of said hole and which is provided with a peripheral recess between its ends of greater diameter than the hole diameter, a rigid coupling unit consisting of a central segment of a cylinder of a diameter to fit within said hole and of a thickness to pass within said opening, provided with a peripheral boss adapted to fit within said recess and slotted to receive the tongue of said first mentioned shaft.

3. A universal coupling comprising a shaft provided with a bifurcated end, a non-collapsible coupling unit having longitudinal and transverse axes and adapted to be freely rotated in said bifurcated end about its longitudinal axis, a shaft provided with a tongued end adapted to enter said unit and to pivot therein about the transverse axis of said unit and to be rotated with said first mentioned shaft by the engagement of the sides of said tongued end by said unit.

4. A universal coupling comprising a shaft provided with a bifurcated end, a shaft provided with a tongued end and a coupling unit adapted to be inserted in said bifurcated end, to be partially rotated about its longitudinal axis and thereby be locked against removal transversely or longitudinally and adapted to receive and hold said tongued end of one shaft against rotation relative to said bifurcated end of the other shaft but to permit angular movement of said tongued shaft relative to said bifurcated shaft.

5. In a universal coupling a shaft provided with a slotted end, a shaft provided with a tongued end, and a pivoting member adapted to be inserted in said slotted end of one shaft and to be locked against removal transversely or longitudinally by a partial rotation after insertion and to then present holding and pivotal surfaces for said tongued end of the other shaft.

6. In a universal coupling, a shaft provided in its end with a transverse slot having a cylindrical bearing; a removable pivotal unit consisting of opposite segments of a cylinder mounted in said bearing and permanently spaced apart by an integral portion forming a cylindrical bearing means whose axis is transverse the axis of said unit; and a shaft terminating in a transverse tongue adapted to enter said slot and between said segments and provided with a slot adapted to receive said means.

7. Means for coupling the ends of two shafts comprising a flat tongue extension on one of said shafts; a transverse opening in the adjacent end of the other of said shafts, with opposed cylindrical recesses in the sides of said opening; and a pivotal element adapted to be inserted in said element, to be turned so as to journal in said recesses and, when so turned, to be locked thereby against removal longitudinally or transversely and to present faces for flexibly holding said tongue extension against movement transversely or rotatively of said opening but allowing it pivotal movement about the longitudinal and transverse axes of said element.

8. In a universal coupling, a member having a flat tongue, a member having a transverse cylindrical hole near one end and a relatively narrow passage from said hole to the adjacent ends of the member, and a coupling unit comprising cylindrical segments journaled in said hole and permanently spaced far enough apart to receive said flat tongue between them and to prevent their withdrawal through said passage when spaced transversely of said passage, the width of each of said segments being less than the width of said passage to permit their withdrawal through said passage when rotated to aline therewith.

9. In a universal coupling, a member having a flat tongue, a member having a transverse, cylindrical hole near one end and a relatively narrow passage from said hole to the adjacent end of the member, and a coupling unit comprising cylindrical segments journaled in said hole and spaced apart, by a shouldered stud having trunnions extending into said segments without engaging the sides of said hole, far enough to receive said tongue between them and to prevent their withdrawal through said passage, each segment being narrow enough to be withdrawn through said passage transversely of the segment's chord.

In testimony whereof I have hereunto subscribed my name this 28, day of April, 1919.

LORENZ IVERSEN.